United States Patent
Troxel et al.

[15] 3,682,938
[45] Aug. 8, 1972

[54] BIS(TRIFLUORO METHYL)-2-PYRIDINOLS

[72] Inventors: Lillian H. Troxel, Antioch, Calif. 94509; Howard Johnston, Walnut Creek, Calif. 94596

[73] Assignee: The Dow Chemical Company, Midland, Mich.

[22] Filed: Dec. 18, 1970

[21] Appl. No.: 99,667

[52] U.S. Cl.....................260/297 R, 424/263, 71/94
[51] Int. Cl.............................................C07d 31/28
[58] Field of Search.................................260/297 R

[56] References Cited

UNITED STATES PATENTS 3,609,158    9/1971    Torba........................260/295

*Primary Examiner*—Alan L. Rotman
*Attorney*—Griswold & Burdick, Gary D. Street and C. Kenneth Bjork

[57] ABSTRACT

This invention provides bis(trifluoromethyl)-2-pyridinols having the formula:

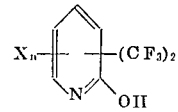

wherein
  each X independently represents bromo, chloro or iodo; and
  n represents an integer of from 0 to 2, both inclusive.

The novel compounds are active as herbicides and fungicides and are useful as intermediates in the production of bis(trifluoromethyl)pyridyl phosphates which compounds are useful pesticidal agents.

6 Claims, No Drawings

BIS(TRIFLUOROMETHYL)-2-PYRIDINOLS

SUMMARY OF THE INVENTION

The present invention is directed to a series of novel bis(trifluoromethyl)-2-pyridinol compounds corresponding to the following formula:

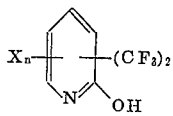

wherein
each X independently represents bromo, chloro or iodo; and
n represents an integer of from 0 to 2, both inclusive.

The compounds of the present invention are crystalline solids at room temperature, of low solubility in water and of varying degrees of solubility in many common organic solvents. It has been found that the compounds of the present invention are particularly effective as herbicides and fungicides and are especially adapted to be employed as active toxicants in compositions employed for the control of various plant species and fungal organisms. The compounds are also useful as intermediates in the production of bis(trifluoromethyl)pyridyl phosphates which in turn are useful pesticidal agents.

The novel compounds of the present invention are generally prepared by reacting a corresponding bis(trifluoromethyl)pyridine compound having the formula:

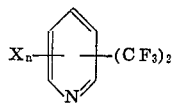

wherein
X and n are as hereinbefore defined, with an aqueous sodium hydroxide solution. An appropriate inert solvent, which serves as a carrier reaction medium as well as a solubilizing agent for the pyridine reactant, is also employed. Representative inert solvents which can be employed as reaction media include, for example, dimethylsulfoxide, dimethylformamide and the like.

The amounts of the reactants to be employed are not critical, some of the desired product being obtained when employing the reactants in any proportions. However, the reactants are ordinarily employed in amounts representing at least equimolar proportions and the employment of such proportions, or an excess of the sodium hydroxide reactant, is preferred. The pressure under which the reaction is carried out is not critical and is usually maintained at ambient atmospheric pressure; super atmospheric pressures can be employed if desired.

In carrying out the reaction, the pyridine and sodium hydroxide reactants are contacted in any convenient fashion and the solvent carrier subsequently added. The resulting reaction mixture is heated at a temperature of from about 95° to about 125°C. for a period of time sufficient to assure substantial completion of the reaction, preferably from about ½ to about 3 hours. Following the completion of the reaction, the reaction mixture is cooled and acidified with a concentrated acid, such as hydrochloric, to a pH of about 1.0. The product precipitate formed upon acidification is filtered off, dried, and dissolved in appropriate organic solvent, such as benzene, acetone, chloroform, carbon tetrachloride, and the like. The resulting solution is treated with activated charcoal, filtered, and the filtrate concentrated by distillation. The concentrated filtrate is then cooled to form the precipitate of the desired pyridinol compound. The product thus obtained can be further purified by conventional procedures such as washing, solvent extraction and recrystallization from organic solvents.

DESCRIPTION OF THE PREFERRED EMBODIMENTS

The following examples illustrate the present invention but are not to be construed as limiting.

EXAMPLE 1

Dimethylsulfoxide (about 25 milliliters) was added to a mixture of sodium hydroxide (4.8 grams; 0.12 mole) and 2-chloro-3,5-bis(trifluoromethyl)pyridine (10.1 grams; 0.04 mole) in 25 milliliters of water. The resulting, nearly homogeneous, mixture was heated with agitation at a temperature of about 110°C. for a period of about one hour. Following the completion of the reaction, the reaction mixture was cooled and acidified with concentrated hydrochloric acid to a pH of about 1.0. The product precipitate formed upon acidification was filtered off, dried, and dissolved in benzene. The resulting solution was treated with activated charcoal and filtered; the filtrate thus obtained was concentrated, by distilling off benzene, to a quantity of about 25 milliliters. Cooling of the concentrated filtrate gave a white crystalline precipitate identified as the desired 3,5-bis(trifluoromethyl)--2-pyridinol compound melting at 142°–143°C. Elemental analysis calculated for $C_7H_3F_6NO$ (percent): C, 36.4; H, 1.3; N, 6.1; F, 49.3. Found (percent): C, 36.6; H, 1.2; N, 6.0; F, 49.22.

In procedures similar to those described in example 1, the following pyridinol compounds are prepared.

4,6-bis(trifluoromethyl)-2-pyridinol as a white crystalline solid melting at 73°–74°C., by reacting together sodium hydroxide and 2-chloro-4,6-bis(trifluoromethyl)-pyridine.

6-chloro-3,5-bis(trifluoromethyl)-2-pyridinol as a white crystalline solid melting at 182°–183°C., by reacting together sodium hydroxide and 2,6-di-chloro-3,5-bis(trifluoromethyl)pyridine. 6-bromo-3,5-bis(trifluoromethyl)-2-pyridinol having a molecular weight of 310, by reacting together sodium hydroxide and 2,6-dibromo-3,5-bis(trifluoromethyl)pyridine.

6-iodo-3,5-bis(trifluoromethyl)-2-pyridinol having a molecular weight of 357, by reacting together sodium hydroxide and 2,6-diiodo-3,5-bis(trifluoromethyl)pyridine.

4,6-dichloro-3,5-bis(trifluoromethyl)-2-pyridinol having a molecular weight of 300, by reacting together sodium hydroxide and 2,4,6-trichloro-3,5-bis(trifluoromethyl)-pyridine.

4,6-dibromo-3,5-bis(trifluoromethyl)-2-pyridinol having a molecular weight of 389, by reacting together sodium hydroxide and 2,4,6-tribromo-3,5-bis(trifluoromethyl)-pyridine.

4,6-diiodo-3,5-bis(trifluoromethyl)-2-pyridinol having a molecular weight of 483, by reacting together sodium hydroxide and 2,4,6-triiodo-3,5-bis(trifluoromethyl)-pyridine.

3,5-dichloro-4,6-bis(trifluoromethyl)-2-pyridinol having a molecular weight of 300, by reacting together sodium hydroxide and 2,3,5-trichloro-4,6-bis(trifluoromethyl)-pyridine.

3,5-dibromo-4,6-bis(trifluoromethyl)-2-pyridinol having a molecular weight of 389, by reacting together sodium hydroxide and 2,3,5-tribromo-4,6-bis(trifluoromethyl)-pyridine.

3,5-diiodo-4,6-bis(trifluoromethyl)-2-pyridinol having a molecular weight of 483, by reacting together sodium hydroxide and 2,3,5-triiodo-4,6-bis(trifluoromethyl)-pyridine.

The compounds of the present invention are suitable for use as herbicides and fungicides. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

It is to be understood, however, that all of the compounds claimed and compositions containing them may not be equally effective at similar concentrations or against the same plant species or fungal organisms. The exact concentration of the toxic constituent to be employed in the treating compositions is not critical and may vary considerably provided the plant or fungal organism and/or their habitats are contacted with an effective amount of the toxicant. Good results are obtained when compositions containing controlling and fungicidal concentrations, usually from about 500 to 10,000 parts per million by weight of one or more of the compounds, are employed. The concentration of toxicants in liquid compositions generally is from about 1.0 to 50 percent by weight. Concentrations up to 95 weight percent are often employed. In dusts, the concentration of the toxicant can be from about 1.0 to 10 weight percent; however, concentrations up to 95 weight percent are often conveniently employed. In compositions to be employed as concentrates, the toxicant can be present in a concentration of from 5 to 98 weight percent.

In representative operations, separate compositions containing 500 parts of 4,6-bis(trifluoromethyl)-2-pyridinol, 6-chloro-3,5-bis(trifluoromethyl)-2-pyridinol and 3,5-bis-(trifluoromethyl)-2-pyridinol as sole toxicant per million parts by weight of ultimate treating composition were prepared and separately applied to the environments containing and supporting thriving members of one of a variety of fungal organisms. Each of the [4,6-bis]- and [6-chloro-4,6-bis]-(trifluoromethyl)-2-pyridinol compounds gives complete control of *Staphylococcus aureus*, *Bacillus subtilis* and *Mycobacterium phlei*, while 3,5-bis(trifluoromethyl)-2—pyridinol gives complete control of *Bacillus subtilis* and *Mycobacterium phlei* at the above concentration.

In further representative operations, each of the above-named compounds gives complete control and kill of pigweeds when compositions containing them are separately applied to pigweeds at a rate of 20 pounds per acre by weight.

The starting bis(trifluoromethyl)pyridine compounds [e.g., 2-chloro-3,5-bis(trifluoromethyl)pyridineh suitable for preparing the corresponding bis(trifluoromethyl)-2--pyridinol compounds are prepared by contacting an appropriate bis(trifluoromethyl)pyridine with molten antimony trifluoro-dichloride at a temperature of from about 80° to about 100°C. for a period of from about ½ to 2 or more hours. Under the above reaction procedures, the —CCl₃ groups in the starting compounds are converted to —CF₃ groups.

The bis(trichloromethyl)pyridine compounds are known and may be prepared by the photochlorination of methyl substituted pyridines as set forth in U.S. Pat. No. 3,135,594.

What is claimed is:
1. A compound corresponding to the formula

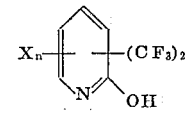

wherein each X independently represents bromo, chloro or iodo, and $n$ represents an integer of from 0 to 2, both inclusive.

2. A compound as in claim 1 wherein X is chloro and $n$ is 1.

3. A compound as in claim 1 wherein $n$ is 00

4. A compound as in claim 1 which is 4,6-bis(trifluoromethyl)-2-pyridinol.

5. A compound as in claim 1 which is 3,5-bis(trifluoromethyl)-2-pyridinol.

6. A compound as in claim 1 which is 6-chloro-3,5--bis(trifluoromethyl)-2-pyridinol.

* * * * *

PO-1050
(5/69)

UNITED STATES PATENT OFFICE
CERTIFICATE OF CORRECTION

Patent No. 3,682,938          Dated August 8, 1972

Inventor(s) Lillian H. Troxel & Howard Johnston

It is certified that error appears in the above-identified patent and that said Letters Patent are hereby corrected as shown below:

In column 4, line 22, 2-chloro-3,5-bis(trifluoromethyl)-pyridineh should be 2-chloro-3,5-bis(trifluoromethyl)-pyridine]

In column 4, line 25, bis(trifluoromethyl)pyridine should be bis(trichloromethyl)pyridine In column 4, line 48 (Claim 3), OO should be O.

Signed and sealed this 20th day of February 1973.

(SEAL)
Attest:

EDWARD M. FLETCHER, JR.          ROBERT GOTTSCHALK
Attesting Officer          Commissioner of Patents